PROCESS FOR THE PRODUCTION OF PROPYLENE OXIDE

Adin L. Stautzenberger and Al H. Richey, Corpus Christi, Tex., assignors to Celanese Corporation, a corporation of Delaware
No Drawing. Filed Jan. 22, 1959, Ser. No. 788,280
13 Claims. (Cl. 260—348.5)

This invention relates to the production of propylene oxide.

It is an object of this invention to provide a new and efficient process for the production of propylene oxide from propylene.

Other objects of this invention will be apparent from the following detailed description and claims. In the description and claims all proportions are by weight unless otherwise indicated.

In accordance with one aspect of this invention propylene is reacted with peracetic acid in a substantially inert solvent. The propylene may be introduced into the reaction zone in the liquid or gaseous state; it dissolves in the inert solvent. For best results the peracetic acid should be supplied as a solution having a relatively low content of acetic acid, the ratio of peracetic acid to acetic acid being at least about 4:1 by weight. The reaction mixture should also be substantially free of mineral acids; these act as esterification and hydrolysis catalysts and reduce the yield of the desired product. Excellent results are obtained with solvents such as methylal and methyl acetate, which are substantially free of active hydrogens (as determined, for example by the well-known Zerevitinov method). Another suitable solvent is acetone. Other solvents, which may be suitable in the absence of strong acids or strong bases, are methanol and water. The concentration of peracetic acid in the solvent in the feed to the reaction zone may be, for example, in the range of about 5 to 35%.

For best results the reaction temperatures should be relatively low, preferably in the range of about 15 to 60° C. The reactants should be maintained at superatmospheric pressure, which may be autogenous, to keep the propylene in solution. One suitable range of pressure is about 100 to 300 p.s.i.g.

The mole ratio of propylene oxide to peracetic acid supplied to the reaction zone should be at least 1:1, preferably about 1.1:1 to 1.3:1. A large excess of propylene is wasteful and requires recycling of unreacted propylene. Since commercial propylene generally is contaminated with about 1 or 2 to 10% of propane, recycling requires removal of the propane in order to prevent the concentration of the latter from increasing unduly. We have found that our process produces such high yields of propylene oxide, even when only a small excess of propylene is used, that recycling of unreacted propylene need not be employed for economical operation. Removal of propane from the propylene feed or effluent is unnecessary. The reaction time is preferably such that conversion of the peracetic acid is substantially complete.

It is sometimes desirable to add a sequestering agent, such as sodium pyrophosphate or ethylenediaminetetracetic acid, to take up heavy metal ions (e.g. Fe or Mn ions) which may catalyze decomposition of peracetic acid in the reaction zone. The reaction mixture is mildly acidic.

The propylene oxide produced by the reaction may be recovered, by distillation, from the solvent and from the acetic acid produced in the reaction and from any higher boiling esters which may be formed. The solvent, acetic acid and high boilers may also be separated from each other by distillation.

The following examples are given to illustrate this invention further.

Example I

A 30% solution of peracetic acid in methylal is placed in a stainless steel (type 316) autoclave. The solution contains 0.039 mole of acetic acid per mole of peracetic acid, and 100 p.p.m. of sodium pyrophosphate.

Cold liquefied propylene, 99% pure, in amount of 1.2 moles per mole of peracetic acid, is added to the autoclave, which is then sealed and maintained at 42° C. with agitation for ten hours, during which period the autogenous pressure reaches a maximum of 50 p.s.i.g. The autoclave is then cooled to 10° C. Iodometric analysis of the reaction product shows that all the peracetic acid has reacted and that the yield of propylene oxide is 0.915 mole per mole of peracetic acid. There is also produced 0.03 mole of propylene glycol monoacetate per mole of peracetic acid. The acetic acid in the product is equal to slightly more than 1 mole per mole of peracetic acid in the feed.

Example II

Example I is repeated, except that the solvent is methyl acetate and the reactants are fed continuously to a thoroughly stirred stainless steel reactor, where reaction is effected under pressure. The propylene, which contains 10% propane, is fed as a gas under a pressure of 200 p.s.i.g. From the stirred reactor, where about 85% of the reaction takes place, the reaction mixture is passed through a tube (maintained at the reaction temperature of 42° C.) where the reaction is completed. The products are fed to a distillation column where unreacted propylene and propane are taken off overhead, then to a second distillation column where propylene oxide (boiling at 35° C. at atmospheric pressure) is taken overhead. The residue is then fed to a third distillation column where the methyl acetate is taken overhead the residue from the third column is then distilled in a fourth column where acetic acid is taken overhead and from the base of which high boilers consisting mainly of propylene glycol monoacetate are removed.

It is to be understood that the foregoing detailed description is merely given by way of illustration and that many variations may be made therein without departing from the spirit of our invention.

Having described our invention what we desire to secure by Letters Patent is:

1. Process for the production of propylene oxide which comprises reacting propylene and peracetic acid containing at most about ¼ mole of acetic acid per mole of peracetic acid in an inert solvent, and recovering propylene oxide from the products of the reaction.

2. Process as set forth in claim 1 in which the reaction temperature is at most about 15° C. to 60° C.

3. Process for the production of propylene oxide which comprises continuously feeding propylene and a solution of peracetic acid in an inert solvent containing at most about ¼ mole of acetic acid per mole of peracetic acid to a reaction zone, the mole ratio of propylene to peracetic acid being about 1.1:1 to 1.3:1, continuing the reaction in said zone until substantially all the peracetic acid has been reacted, and continuously removing the reaction products, including propylene oxide, from said zone.

4. Process as set forth in claim 3 in which a sequestering agent for heavy metal ions is present in the reaction zone.

5. Process as set forth in claim 3 in which the reaction temperature is at most about 15° C. to 60° C.

6. Process as set forth in claim 5 in which the concentration of peracetic acid in said solvent is about 5 to 35%.

7. Process as set forth in claim 5 in which the solvent comprises methylal.

8. Process as set forth in claim 5 in which the solvent comprises methyl acetate.

9. Process as set forth in claim 3 in which the propylene contains about 2 to 10% of propane.

10. Process for the production of propylene oxide which comprises continuously feeding propylene and a solution of peracetic acid in an inert solvent to a reaction zone, the mole ratio of propylene to peracetic acid being about 1.1:1 to 1.3:1, continuing the reaction in said zone until substantially all the peracetic acid has been reacted, and continuously removing the reaction products, including propylene oxide, from said zone.

11. A process for the production of propylene oxide which comprises reacting propylene with a solution of peracetic acid dissolved in a mixture of acetic acid and methylal, the concentration of the solution being from about 22.0 percent to about 30.7 percent by weight of peracetic acid, at a temperature in the range of about 30° to 80° centigrade and a pressure of from about 50 pounds per square inch to about 200 pounds per square inch, and in such proportions that the molar ratio of propylene to peracetic acid lies in the range from 1.3:1 to 3.5:1.

12. A process for the production of propylene oxide which comprises reacting propylene with a solution of peracetic acid dissolved in a mixture of acetic acid and methylal the concentration of the solution being from about 5–35% by weight of peracetic acid, at a temperature in the range of about 15°–60° centigrade and a pressure sufficient to keep the propylene in solution to about 200 pounds per square inch and in such proportions that the molar ratio of propylene to peracetic acid lies in the range of 1.1:1 to 1.3:1.

13. A process for the production of propylene oxide which comprises reacting propylene with a solution peracetic acid dissolved in a mixture of acetic acid and acetone the concentration of the solution being from about 5–35% by weight of peracetic acid, at a temperature in the range of about 15°–60° centigrade and a pressure sufficient to keep the propylene in solution to about 200 pounds per square inch and in such proportions that the molar ratio of propylene to peracetic acid lies in the range of 1.1:1 to 1.3:1.

References Cited

UNITED STATES PATENTS

| | | | |
|---|---|---|---|
| 2,366,724 | 1/1945 | Gardner | 260—348.5 |
| 2,776,301 | 1/1957 | Payne et al. | 260—348.5 |
| 2,838,524 | 6/1958 | Wilson | 260—348.5 |
| 2,899,446 | 8/1959 | Marks | 260—348.5 |
| 2,917,521 | 12/1959 | Phillips et al. | 260—348.5 |

FOREIGN PATENTS 525,888   6/1956   Canada.

OTHER REFERENCES

Becco Bulletin No. 69, Nov. 1955, pp. 1–7.
Chemical and Engineering News, April 23, 1956, p. 2064.
Swern: Organic Peracids, Chem. Reviews, vol. 45 (1949), pp. 1–68.
Swern: J. Am. Chem. Soc., vol. 69, pp. 1692–1698 (1947).
Tech. of Org. Chem., vol. 8 (1953), pp. 411–413.
The Condensed Chemical Dictionary, fifth edition, Copyright 1956, p. 974.
Union Carbide Publication "Peracetic Acid Derivatives," Copyright 1957, p. 7.

JOHN D. RANDOLPH, *Primary Examiner.*

WALTER A. MODANCE, IRVING MARCUS, NORMA S. MILESTONE, *Examiners.*

E. BERG, G. S. ROSEN, J. FRIEDENSON, GORDON K. MILESTONE, *Assistant Examiners.*